United States Patent

Birkelbach

[11] Patent Number: 5,882,161
[45] Date of Patent: Mar. 16, 1999

[54] SELF-DRILLING AND THREAD-FORMING SCREW HAVING A FLOW-FORMING SECTION

[75] Inventor: Ralf Birkelbach, Bad Laasphe, Germany

[73] Assignee: EJOT Verbindungstechnik GmbH & Co., Bad Laasphe, Germany

[21] Appl. No.: 669,339
[22] PCT Filed: Nov. 10, 1995
[86] PCT No.: PCT/EP95/04438

§ 371 Date: Apr. 20, 1998

§ 102(e) Date: Apr. 20, 1998

[87] PCT Pub. No.: WO96/15378

PCT Pub. Date: May 23, 1996

[30] Foreign Application Priority Data

Nov. 11, 1994 [DE] Germany .......................... 44 40 437.9

[51] Int. Cl.$^6$ .............. F16B 25/00; B27G 15/00
[52] U.S. Cl. .......................... 411/387; 411/386; 411/421; 408/228; 408/230
[58] Field of Search .............................. 411/29, 386, 387, 411/417, 418, 420, 421; 408/215, 216, 226, 227, 228, 229, 230

[56] References Cited

U.S. PATENT DOCUMENTS 4,068,554  1/1978  Hirabayashi ........................ 411/386
4,836,730  6/1989  Jesson et al. ...................... 411/387

Primary Examiner—Kenneth J. Dorner
Assistant Examiner—Robert G. Santos
Attorney, Agent, or Firm—Frohwitter

[57] ABSTRACT

A self-drilling and thread-forming screw comprises a threaded shank, a drilling section arranged in front of the shank and having a uniform diameter, and a thread-free flow-forming section widening conically between the drilling section and the shank. The drilling section has two chip grooves which run diametrically opposite one another, are bounded by flute edges and cutting edges, and end in a drilling tip with the cutting edges running together at the tip. The diameter formed by the cutting edges is smaller than a minor diameter of the threaded shank, and the largest diameter of the flow-forming section corresponds to the minor diameter of the shank and includes a symmetrical polygonal cross-section with rounded-off corners in a region adjoining the shank. The chip grooves also extend from the cutting edges over a substantial part of the flow-forming section, the flute edges run in the direction of the shank tangentially into the rounded-off corners, a transition region is provided between the drilling and flow-forming sections, and bead-shaped prominences are formed on the drilling section remote from the chip grooves. The prominences form an increasing cross-sectional extent as they merge continuously in the transition region into the rounded-off corners diametrically opposite one another, such that this extent is equal to the diameter formed by the cutting edges in the transition region and is greater than the diameter formed by the cutting edges in the flow-forming section.

13 Claims, 4 Drawing Sheets

Section A-A

Section B-B

Section C-C

Section D-D

Section E-E

5,882,161

SELF-DRILLING AND THREAD-FORMING SCREW HAVING A FLOW-FORMING SECTION

BACKGROUND OF THE INVENTION

The invention relates to a self-drilling and thread-forming screw according to the preamble of claim 1.

G 92 11 354.0 discloses such a self-drilling and thread-forming screw. To form a cylindrical passage in a metal sheet with such a screw, however, requires a high expenditure of force with the screw, consisting of a drilling section, a flow-forming section and a threaded shank, since there is no uniform transition, but rather an edge, between the essentially cylindrical drilling section and the essentially conically running flow-forming section, which is also designated as a flaring section. In the region of the chip groove extending from the cutting edges of the drilling section, a shoulder is formed between the cylindrical drilling section and the conical flaring section. This shoulder results from the fact that the chip groove at the end of the cylindrical drilling section runs out virtually at right angles to the screw axis and a material accumulation occurs above the chip groove, which material accumulation has a distinctly greater diameter than the effective diameter, formed by the cutting edges, of the drilling section. On the one hand, this shoulder requires a substantially larger contact pressure to be exerted on the screw after the relatively easy penetration by the drilling section in order to press the described shoulder through the sheet and to allow the conical flaring section to come into effect; on the other hand, such a shoulder greatly reduces the applicability for higher-strength sheets. Since in this known screw the chip groove merely extends over the length of the drilling section, the drill chips which collect in this chip groove and expediently have to be discharged may jam between the sheet material and the shoulder described above, so that the friction heat which is generated is transmitted essentially to the chips and not to the sheet. This impairs the flow-forming operation inasmuch as the flow-forming section may tend to form cracks during the forming.

U.S. Pat. No. 5,141,376 discloses a self-drilling and thread-forming screw which has a drilling section, a conically running region provided with thread turns, and a threaded shank. Directly after the drilling of the sheet with the drilling section, the thread is formed by the conical threaded region directly adjoining the drilling section, which corresponds to the forming of a thread in a plurality of production stages. Such a self-drilling screw has the disadvantage that, when screwing into thin sheet, the thread bites immediately after the sheet is drilled through and the drilled hole may tear due to a forced feed occurring after the biting of the thread. Therefore only an inadequate thread depth and thus inadequate retaining stability are achieved with such a self-drilling screw, which leads to a limited overtorque. Furthermore, cracking of the sheet opened out with such a screw cannot be ruled out. In addition, the drilling region directly adjoins the conical threaded section so that the chip grooves located in the drilling section end at the region in which the conically formed thread begins. The chips produced in the drilling section by the drilling operation are therefore conveyed directly into the region in which the thread is formed. As a result, not only is considerable friction energy likewise passed into the chips instead of into the hole region to be opened out but the chip material which gets in the way during the formation of the thread may lead to incorrect formation of the thread and thus likewise to a reduction in the overtorque.

A beading and thread-cutting screw is described in DE-AS 22 43 707. This beading and thread-cutting screw has a cylindrical threaded shank and a flaring section tapering towards the screw end and having a non-circular cross-sectional area, the non-circular cross-sectional area preferably being designed as an elliptical area. The flaring section is designed in such a way that it has smooth peripheral regions provided with thread-turn sections. The fact that the axis of the conical flaring section is offset from the axis of the threaded shank and a guide pin which is coaxial with the threaded shank adjoins the flaring section is intended to ensure that the eccentric flaring section beads the margin of a hole. Although in one exemplary embodiment the lower region of this screw has a chip groove which extends over the drilling section into the flaring section, the drilling section merges into the flaring section without a smooth transition due to a sharp edge, and furthermore the chip groove is arranged in front of the chip edges in the direction of rotation so that the chips removed from the chip edges collect in the chip groove during the drilling operation and cannot be readily discharged from the chip groove. There is therefore the risk that, during the beading operation following the drilling, the chips will primarily absorb the friction energy produced, as a result of which the flow properties of the material deteriorate and cracking may occur. In addition, a relatively large contact force of the screw is required to overcome the discontinuous transition between the drilling section and the flaring section in order to allow the flaring section to come into effect. In such a screw, the flow operation is also associated with considerable vibrations, which are transmitted in an intolerable manner either to the workpiece to be fastened or via the screw to the screwdriving tool. Since the drilling section designated as guide pin can no longer serve as guide pin after passing through the sheet, uniform forming or furrowing of the thread is not possible, since thread turns formed first can destroy following thread turns. In addition, such a self-drilling and thread-forming screw is not possible in particular for higher-strength sheets, the use of which is gaining in importance.

U.S. Pat. No. 3,937,120 discloses a thread-forming screw which has a leading or guide drilling tip from which two longitudinal chip grooves extend which have generally flat and essentially coplanar radial walls which form the side cutting edges. The front region of the thread-forming screw has a drilling section as well as a conical area extending up to the threaded shank, in which case the cutting edges running from the drill tip extend in the axial direction due to formed chip grooves up to the start of the threaded shank but run discontinuously due to discontinuously adjoining sections. In such a screw, material in the form of chips is therefore cut out of the hole up to the region of the threaded shank and can thereby be carried directly into the region in which the thread is to be formed. The forming of the thread is therefore permanently disturbed by the presence of chips, for which reason the overtorque which can be achieved with such a screw is very limited due to an incorrectly formed thread.

SUMMARY OF THE INVENTION

It is therefore the aim of the invention to provide a self-drilling and thread-forming screw having a flow-forming section, which screw reduces the axial contact force compared with known embodiments, realizes a high overtorque with optimized discharge of the chips produced during the drilling when thin sheet is used, and reduces the screw-in time and also works reliably in the case of higher-strength sheets.

This aim is achieved by a screw having the features according to claim 1.

Such a self-drilling and thread-forming screw has a threaded shank and a drilling section which is arranged in front of it and has an essentially uniform diameter, there being an essentially conically widening, thread-free, flow-forming section between the drilling section and the threaded shank.

In each case chip grooves diametrically opposite one another run in the longitudinal direction from cutting edges of the drilling section, which chip grooves are in turn bounded by flute edges and cutting edges. The cutting edges formed in the lower drilling section run together in the centre and form the tip of the drilling section. In order to have to exert as small a drilling force as possible and on the other hand in order to produce as large a collar as possible around the drilled hole, the diameter formed by the cutting edges is substantially smaller than the minor diameter of the threaded shank. The flow-forming section arranged between the drilling section and the threaded shank, the largest diameter of which flow-forming section corresponds approximately to the minor diameter of the threaded shank, has an essentially symmetrical polygonal cross-section in a region adjoining the threaded shank. The cross-section is nonetheless designed to be continuous, since its corners are rounded off. Furthermore, in order to realize easy, uniform and vibration-free screwing-in of the self-drilling and thread-forming screw according to the invention, the drilling section, the flow-forming section and the threaded shank are arranged on a common rotation axis.

In order to prevent the chips produced during the drilling from getting in the way during the flow-forming operation or even during the thread-forming process, the chip grooves of the screw according to the invention are designed in such a way that they extend from the cutting edges of the drilling section at least over a substantial part of the flow-forming section and their flute edges run in the direction of the threaded shank tangentially into the rounded-off corners of the polygonal cross-section. This ensures that the chip groove essentially follows the motion curve which is produced by the inertia forces acting on the chips and by the rotation, as a result of which the chip discharge is facilitated. Furthermore, the chip discharge is also facilitated owing to the fact that a chip discharge is ensured, inter alia, also as a result of the mass moment of inertia of the chips, even during the first part of the flow-forming operation, yet after the completion of the drilling operation, i.e. after the drilling section passes through the sheet. Furthermore, a transition region is provided between the drilling section and the flow-forming section, which transition region not only helps to reduce the contact force to be exerted on the screw but also ensures a smooth transition between drilling operation and flow-forming operation with reduced application of force.

Formed on the side of the drilling section remote from the chip grooves are bead-like prominences whose cross-sectional extent, which is formed by the diametral distance between two bead-like prominences, increases in the direction of the transition region so that, in the transition region, this cross-sectional extent is essentially equal to the diameter formed by the cutting edges. In order to produce an especially smooth transition, it is likewise possible for the cross-sectional extent of the bead-like prominences to be slightly smaller than the diameter formed by the cutting edges. This slight reduction may preferably be in the range of 0.1 to 0.3 mm. Furthermore, the bead-like prominences in each case merge continuously in the transition region into the rounded-off corners diametrically opposite one another, the cross-sectional extent of which in the flow-forming section is greater than the diameter formed by the extension of the cutting edge.

In a preferred exemplary embodiment, the chip groove extends approximately over half the axial length of the flow-forming section. In the region without chip grooves, the polygonal cross-section, adjoining the threaded shank, of the flow-forming section is formed by flats in the cross-section, which are separated by the rounded-off corners.

In a further preferred exemplary embodiment, the polygonal cross-section has four rounded-off corners in symmetrical arrangement, two of the rounded-off corners extending essentially over the entire length of the flow-forming section and defining the effective diameter of the flow-forming section.

A further essential advantage of the transition region formed in the case of the screw according to the invention consists in the fact that the line contact, produced during the drilling with a screw according to the invention, along the top edge of the hole when the flow-forming section comes into contact with the top margin of the hole is replaced by a region which represents a much larger friction area, as a result of which a greater and more uniform heat input is achieved at the start of the flow-forming process. There are also no direct disruptive edges, which in screws of the prior art occur at the boundary between the drilling section and the flow-forming section, as a result of which quicker working of larger areas with improved quality can be achieved in the case of screws according to the invention, especially in the initial phase of the flow-forming section.

In a further preferred exemplary embodiment, the chip grooves of the screw are configured in such a way that their flute edges have a curved path in the direction of the threaded section and run rearwards in the screw-in direction of the screw, in which case they approach the outside diameter of the polygonal cross-section of the flow-forming section at an angle to the screw longitudinal axis, which angle is preferably less than 30°, in such a way that they run out tangentially into the rounded-off corners in the flow-forming section. However, it is also possible for the chip grooves to extend over the entire region of the flow-forming section from the transition region up to the threaded section.

In order to ensure as optimum a chip discharge as possible, even at the end of the chip groove, and at the same time to create a transition from the chip groove into the chip-groove-free region of the flow-forming section which likewise reduces the contact force, the chip grooves in the flow-forming section each form in their run-out region a virtually plane surface which approaches the outer contour of the flow-forming section at an angle, which is preferably less than 30°, in order thus to follow the continuous contour of the respective flute edge.

In a further preferred exemplary embodiment in which the chip grooves extend over a substantial part of the flow-forming section, the cutting edges meet the respective flute edge behind the essentially plane surface of the run-out region essentially tangentially at the rounded-off corners which are effective for the flow-forming operation.

In order to create as smooth a transition as possible between drilling operation and flow-forming operation and to be able to realize the start of the flow-forming operation with relatively small contact forces, in a further preferred exemplary embodiment, the radius of the rounded-off corners changes in such a way that it increases continuously from the threaded shank in the direction of the drilling section or the transition region.

BRIEF DESCRIPTION OF THE DRAWINGS

Further advantages, features and possible uses of is the invention are described in detail below with reference to the drawings, in which.

DETAILED DESCRIPTION OF THE INVENTION

Figure 1:
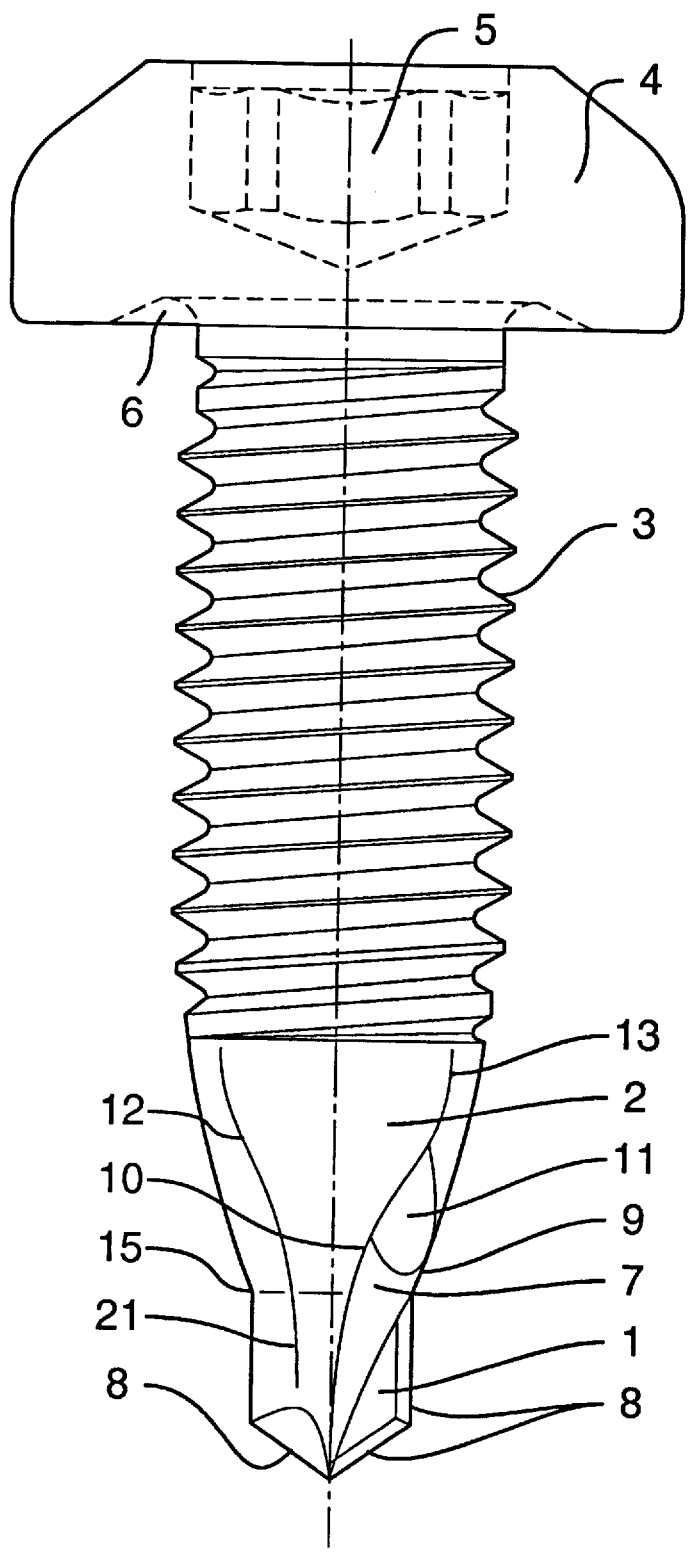
FIG. 1 shows a longitudinal section of the screw according to the invention.

The screw shown in FIG. 1 has a drilling section 1, a flow-forming section 2, a threaded shank 3 and a head 4 having a drive 5. The drive 5 may also be a hexagon integrally formed on the outside of the head 4. An annular groove 6 is made in the bearing surface of the head intended for bearing against the sheet 17, i.e. in the surface facing the threaded shank, which annular groove 6 constitutes a transition from the threaded shank 3 to the bearing surface of the head 4. The part or a part of the last thread turn which adjoins the head 4 of the screw has a reduced outside diameter. At the end of the threaded shank 3 remote from the head 4, the thread likewise has one or more thread turns of reduced outside diameter. In this arrangement, the transition of the region of the threaded shank 3 of reduced outside diameter is effected continuously until the outside diameter of the threaded shank 3 is reached. A section tapering towards the tip of the screw adjoins the end of the threaded shank 3 opposite the head 4 of the screw, the largest diameter of which section corresponds approximately to the minor diameter of the threaded shank 3 and the smallest diameter of which, in a transition region 15, corresponds approximately to the diameter of the drilling section 1 formed by cutting edges 8. The tapering region constitutes a flow-forming section 2, which is also designated as flaring section. The outer contour, apparent from FIG. 1, of the flow-forming section 2 is designed here in such a way that its visible radius increases in the direction of the transition region 15 between the flow-forming section 2 and the drilling section 1, but merges continuously with constant curvature into the transition region 15 at the end adjoining the drilling section 1. However, the flow-forming section may also have a frustoconical configuration. The drilling section 1 extends from the transition region 15 towards the tip of the screw. The drilling section 1 has cutting edges 8 which run from both sides towards the drilling tip and continue in a side section extending essentially in parallel up to the transition region 15 and form the largest diameter of the drilling section 1. Starting from the drilling tip, in each case a chip groove 7 running in the longitudinal direction of the screw is arranged behind the cutting edges. The drilling tip with its two cutting edges 8 forms the part of the drilling section 1 which drills the hole in the workpiece 17 when it is put onto the latter. So that the expenditure of force or the contact force of the screw for drilling out the hole is kept as small as possible and so that, on the other hand, a sufficiently large displacement region is formed during the flow operation, i.e. the flaring operation, which displacement region is necessary for the formation of distinctly more thread turns than the actual thickness of the sheet 17 allows, the diameter of the drilling section 1 formed by the cutting edges 8 is about 50 to 75% of the outside diameter of the threaded shank 3.

The chip grooves 7 running from the drilling tip are defined on one side in each case by a flute edge 10 and on the side opposite the latter by a cutting edge 8 as well as the extension 9 of the cutting edge 8. The chip groove 7 extends in a twisted form, curved backwards relative to the screw-in direction of the screw, from the drilling section 1 into the flow-forming section 2 and extends there over a substantial part of the length of the flow-forming section 2. The flute edge 10 and the extension 9 of the cutting edge 8 meet at the location in the flow-forming region 2 where the chip groove 7 ends. This run-out region of the chip groove 7 forms an essentially plane surface, the margins of which merge continuously by means of radii, i.e. without edges, into the outer contour of the flow-forming section 2 or into the region of the chip groove 7 pointing in the direction of the drilling tip.

A material accumulation which forms a bead-like prominence is provided on the back of the side of the chip groove 7 bounded by the cutting edges 8. On its top side, this bead-like prominence 21 has a radius which decreases in the direction of the transition region 15, located between the flow-forming section 2 and the drilling section 1, without forming a direct edge. In addition, the bead-like prominence 21 increases in the direction of the transition region 15 to a size which, together with the bead-like recess 21 opposite the other cutting edge, forms a diameter which in the transition region 15 is approximately equal to the diameter formed by the cutting edges 8. However, it is also possible for the diameter formed by the bead-like prominences 21 to be $\frac{1}{10}$ to $\frac{2}{10}$ mm smaller in the transition region 15 than the drilling diameter formed by the cutting edges 8. Such a configuration of the transition region 15 ensures that, after drilling is effected by the drilling section 1, the flow-forming section 2 can enter to a certain extent into the drill hole at the upper margin so that more material can be heated more quickly by precisely these enlarged friction areas so that the actual flow-forming operation can be initiated more quickly, more effectively and more uniformly in the transition region. Depending on screw size and configuration, the transition region is in the order of magnitude of 0.2 to about 2 mm, preferably in the range of 0.3 to 1.0 mm and better still in the range of 0.4 to 0.7 mm. The bead-like prominences 21 run continuously in the transition region 15 into the rounded-off corners 12 of the polygonal cross-section of the flow-forming section 2. Likewise, a continuous transition of the cutting edges 8 into the extension 9 of the cutting edges 8 in the transition region 15 is provided so that a smooth or continuous transition from the drilling operation to the flow-forming operation on the one hand and gentle initiation of the actual flow-forming operation on the other hand can be achieved.

Figure 2:
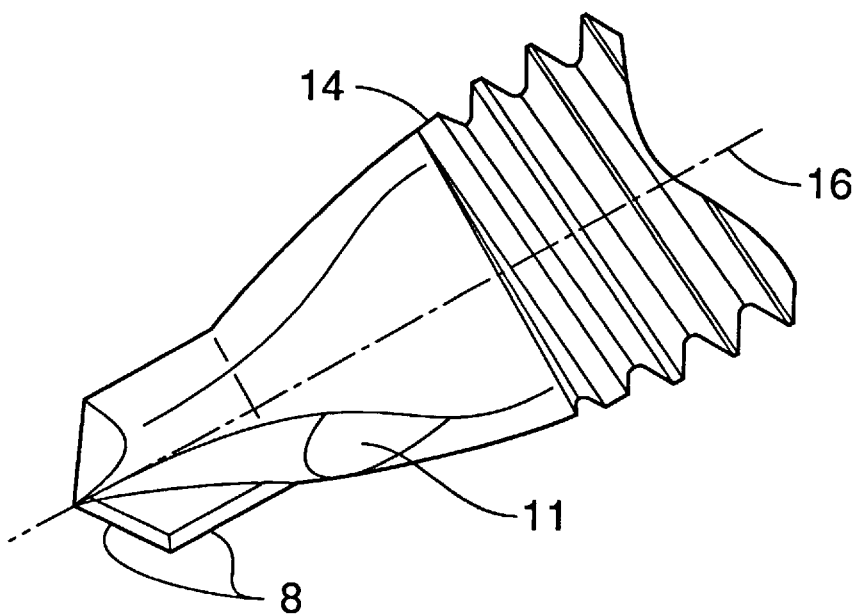
FIG. 2 shows the lower region of the screw according to the invention, which lower region consists of a drilling section, a transition section, a flow-forming section and a threaded shank.

FIG. 2 shows the lower part of the screw according to the invention, comprising the drilling section 1 having the cutting edges 8, the transition section 15 provided between the drilling section 1 and the flow-forming section 2, and a part of the threaded shank 3. All the sections of the screw or parts of the screw lie on a common centre longitudinal axis 16. At the transition from the flow-forming section 2 to the threaded shank 3, the thread has one or more turns 14 of reduced outside diameter in order to realize a smooth transition from the finished flow-formed collar at the hole margin of the sheet 17 to the thread to be cut into this collar.

Figure 3:
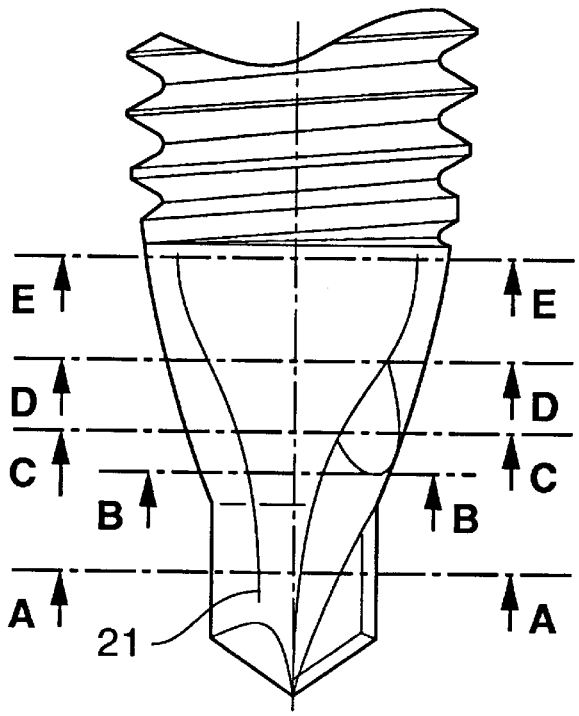
FIG. 3 shows the lower section according to FIG. 2, with characteristic section planes being marked.

FIG. 3 shows the same lower section of the screw as FIG. 2 but with various section planes drawn in the drilling section 1 and in the flow-forming section 2.

The different cross-sections, resulting in these various section planes, of the lower region of the screw according to the invention are shown in FIG. 4.

Figure 4A:
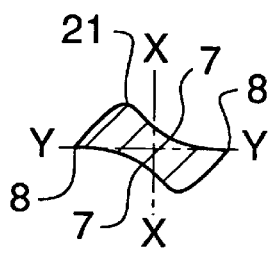
FIG. 4 shows the respective cross-sectional shapes, corresponding to the characteristic section planes according to FIG. 3, of the lower region of the screw according to the invention for both the drilling section and the flow-forming section.

FIG. 4a) shows a section A—A through approximately the centre of the longitudinal extent of the drilling section 1. FIG. 4a) shows that the cross-sectional extent defined by the cutting edges 8 is greater than the cross-sectional extent formed by the bead-like prominences 21. This means that the cutting edges perform the drilling cutting operation.

Figure 4B:
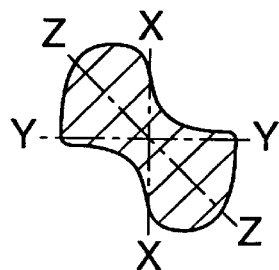

The cross-section shown in FIG. 4b) and lying in section plane B—B shows that, in the region just above the transition region 15 in which the section plane B—B is placed, the greatest cross-sectional extent, which is present on the axis Z—Z, is formed by the rounded-off corners which form the continuation of the rounded-off corners of the polygonal cross-section, adjoining the threaded shank, of the flow-forming section 2. It is apparent that in this section plane B—B the cross-sectional extent formed by the cutting edges 8 is smaller than that lying on the axis Z—Z, so that the cutting edges 8 in this region of the flow-forming section 2 are no longer in engagement with the material of the sheet 17.

Figure 4C:
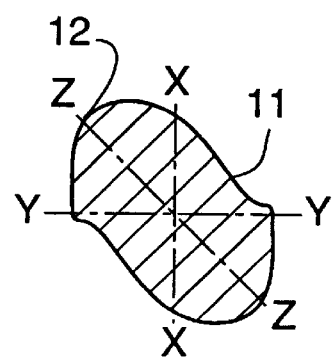

In FIG. 4c), the section plane C—C in the region of the flow-forming section 2 is arranged in such a way that it passes through the essentially plane surface 11 in the run-out region of the chip groove 7. The plane run-out surface 11 of the chip grooves 7 is drawn in the cross-section of the flow-forming section 2 lying in this section plane, the transitions from the surface into the outer contour region of the flow-forming section being formed by radii.

Figure 4D:
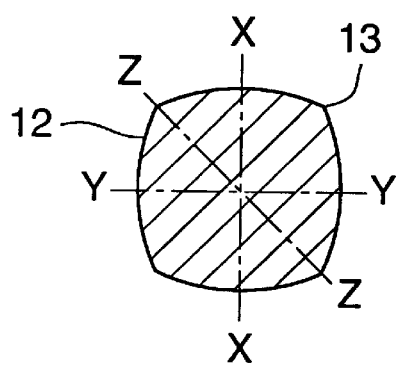

In FIG. 4d), the section plane D—D is placed at the end of the run-out region of the chip groove 7 so that the corresponding cross-section shown results. The actual polygonal cross-section of the flow-forming section having the rounded-off corners 12 and 13 is shown in this cross-section above the chip groove. These rounded-off corners, of which one is drawn on the axis Z—Z in the cross-section, in each case form the greatest cross-sectional extent.

Figure 4E:
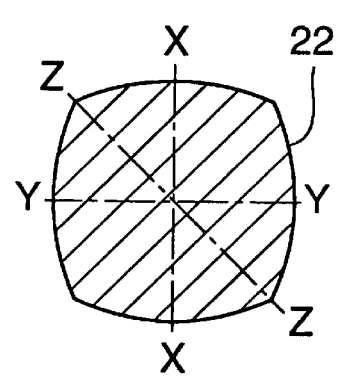

And finally the cross-section of the flow-forming section 2 adjoining the threaded shank 3 in the section plane E—E is shown in FIG. 4e). This cross-section likewise has the fully formed polygonal shape, the greatest cross-sectional dimension of which is formed by the rounded-off corners 12, 13.

Figure 7:
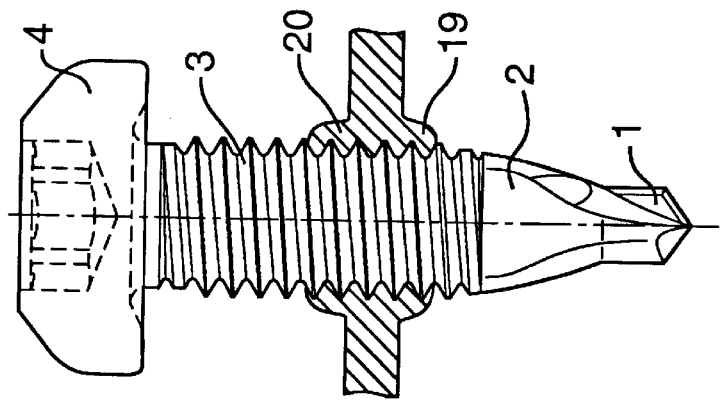
FIG. 7 shows the screw according to the invention screwed into the flow-formed region of the sheet.
Figure 6:
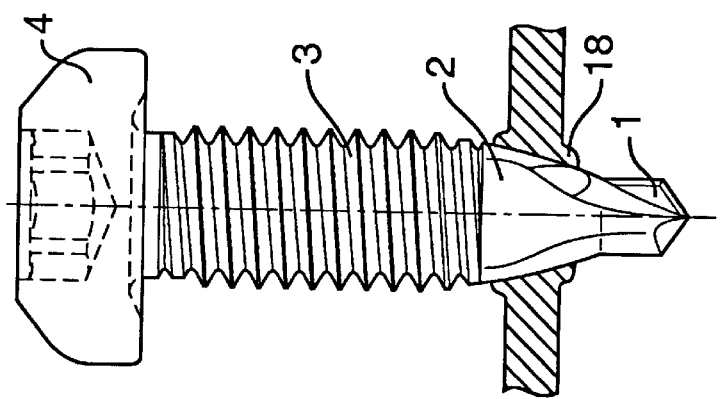
FIG. 6 shows the flow-forming operation achieved with the screw according to the invention.
Figure 5:
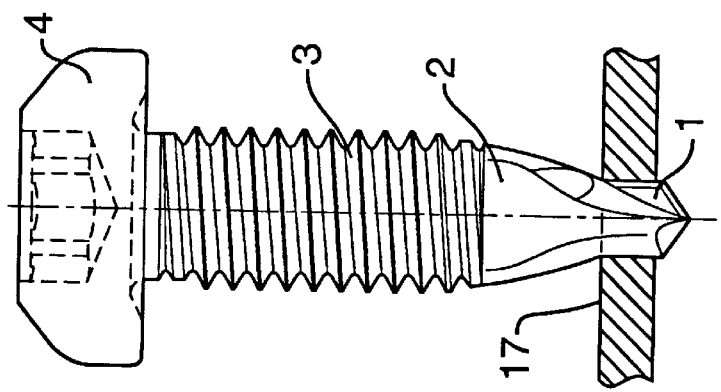
FIG. 5 shows the completion of the drilling operation through the sheet with a screw according to the invention.

The actual screw-in operation is shown in FIGS. 5 to 7. The drilling section 1, which in the case of the screws according to the invention is of relatively thin design, for instance corresponding to a diameter of 2.5 mm in the case of a screw of 5 mm outside diameter, enables a correspondingly narrow drill hole to be drilled with little expenditure of energy, i.e. with a relatively small torque or with a relatively small contact force. The relatively narrow hole drilled with the drilling section 1 enables the transition region to be gently penetrated at the end of the drilling operation for the smooth introduction of the flow-forming section, which causes considerable heating of the relevant workpiece by friction which causes the material of the workpiece 17 to flow. Owing to the fact that the chip grooves are run into the flow-forming section continuously increasing in the direction of the threaded shank of the screw, the chips in the chip grooves 7, which chips are produced during the drilling operation, can be discharged, even after completion of the actual drilling operation, as a result of their mass moment of inertia and as a result of the rotationally induced forces acting on them, so that the obstruction of drilling chips during the flow-forming operation is reduced to the greatest possible extent or is eliminated. The completion phase of the drilling operation is shown in FIG. 5.

By the action of the flow-forming section 2, continuously increasing in the direction of the threaded shank, the softened material of the workpiece 17 flows both against the direction of the screwing-in of the screws and in the same direction and forms during the flowing operation a nozzle which is formed by a collar formed at the hole margin of the workpiece 17. This operation is shown in FIG. 6.

After the complete passage of the flow-forming section 2 through the nozzle, an essentially cylindrical hole is formed through the collar, in which the thread of the threaded section becomes formed or furrowed. In the process, the section formed at the hole in the workpiece 17 is formed as a flow-formed collar-like section 19 at the bottom and to a certain extent also as a flow-formed collar-like section 20 at the top in the direction of the screw head. Therefore the effective material thickness for the formation of the thread is greater than the actual material thickness of the relevant workpiece 17. Collar-like sections 19, 20 which are approximately twice as long as the relevant workpiece 17 is thick can be produced in this way. In addition, the subsequent cooling of this collar-like section leads to a contraction of the material of the workpiece 17, as a result of which the screwed-in screw is additionally held in place. This operation is shown in FIG. 7.

It has proved to be expedient to design the flow-forming section polygonally in cross-section, which is fully formed at least in the region between the end of the run-out region of the chip groove up to the end of the flow-forming section 2 at the threaded shank. This polygonal cross-section therefore has four symmetrical flats which merge continuously one into the other by appropriately rounded-off corners 12, 13 but ensure that only certain regions of the cross-section are in engagement with the material during the flow forming so that the regions in which the engagement regions do not act can be utilized for the displacement of the material transformed into a flow state. It is thus possible to push away the material of the workpiece 17 in both a radial and axial direction when screwing in the flow-forming section 2.

I claim:

1. Self-drilling and thread-forming screw, having a threaded shank (3) and a drilling section (1) which is arranged in front of it and has an essentially uniform diameter, and a thread-free flow-forming section (2) widening essentially conically between the drilling section (1) and the threaded shank (3), the drilling section (1) having two chip grooves (7), which run in the longitudinal direction, are diametrically opposite one another and are in each case bounded by flute edges (10) and cutting edges (8), and ending in a drilling tip having the two cutting edges (8) running together at the tip, and the diameter formed by the cutting edges (8) being substantially smaller than a minor diameter of the threaded shank (3), the flow-forming section (2), the largest diameter of which corresponds approximately to the minor diameter of the threaded shank (3), having an essentially symmetrical polygonal cross-section with rounded-off corners (12, 13) in a region adjoining the threaded shank (3), and in which the drilling section (1), the flow-forming section (2) and the threaded shank (3) lie on a common rotation axis (16), characterized in that a) the chip grooves (7) extend from the cutting edges (8) at least over a substantial part of the flow-forming section (2) and their flute edges (10) run in the direction of the threaded shank (3) tangentially into the rounded-off corners (13) of the polygonal cross-section;

b) a transition region (15) is provided between the drilling section (1) and the flow-forming section (2);

c) bead-like prominences (21) are formed on the side of the drilling section (1) remote from the chip grooves (7), which prominences (21) form an increasing cross-sectional extent in the direction of the transition region (15) so that, in the transition region (15), this cross-sectional extent is essentially equal to the diameter formed by the cutting edges (8); and d) the bead-like prominences (21) in each case merge continuously in the transition region (15) into the rounded-off corners (12) diametrically opposite one another, the cross-sectional extent of which in the flow-forming section (2) is greater than the diameter formed by the extensions (9) of the cutting edges (8).

2. Screw according to claim 1, characterized in that the chip grooves (7) extend approximately over half the axial length of the flow-forming section (2), and, in the region without chip grooves (7), the polygonal cross-section of the flow-forming section (2) adjoining the threaded shank (3) is formed by flats (22) in the cross-section, which are separated by the rounded-off corners (12, 13).

3. Screw according to claim 1, characterized in that the polygonal cross-section has four rounded-off corners (12, 13) and two of the rounded-off corners (12) extend essentially over the entire length of the flow-forming section (2) and define the effective diameter of the flow-forming section (2).

4. Screw according to claim 1, characterized in that the chip grooves (7) of the screw are configured in such a way that their flute edges (10), starting from a small centre axis (X) of the cross-section of the drilling section (1), describe a curved path rearwards in the direction of the threaded shank (3) and in the direction of rotation and approach the outside diameter of the polygonal cross-section of the flow-forming section (2) at an angle to the rotation axis (16) and then run out tangentially into the rounded-off corners (13) in the flow-forming section (2).

5. Screw according to claim 4, characterized in that the angle is less than 30°.

6. Screw according to claim 1, characterized in that, in the flow-forming section (2), the chip grooves (7) in the run-out region each form a virtually plane surface (11) which approaches the outer contour of the flow-forming section (2) at an angle and in the process follows the continuous contour of the respective flute edge (10).

7. Screw according to claim 6, characterized in that the angle is less than 30°.

8. Screw according to claim 2, characterized in that the cutting edges (8) meet the respective flute edge (10) essentially tangentially at the rounded-off corners (13) effective for the flow-forming operation.

9. Screw according to claim 1, characterized in that the radius of the rounded-off corners (12, 13) increases from the threaded shank (3) in the direction of the drilling section (1).

10. Screw according to claim 1, characterized in that the diameter, formed by the cutting edges (8), of the drilling section is 50% to 75% of the outside diameter of the threaded shank (3).

11. Screw according to claim 2, characterized in that the polygonal cross-section has four rounded-off corners (12, 13) and two of the rounded-off corners (12) extend essentially over the entire length of the flow-forming section (2) and define the effective diameter of the flow-forming section (2).

12. Screw according to claim 2, characterized in that the chip grooves (7) of the screw are configured in such a way that their flute edges (10), starting from a small centre axis (X) of the cross-section of the drilling section (1), describe a curved path rearwards in the direction of the threaded shank (3) and in the direction of rotation and approach the outside diameter of the polygonal cross-section of the flow-forming section (2) at an angle to the rotation axis (16) and then run out tangentially into the rounded-off corners (13) in the flow-forming section (2).

13. Screw according to claim 3, characterized in that the chip grooves (7) of the screw are configured in such a way that their flute edges (10), starting from a small centre axis (X) of the cross-section of the drilling section (1), describe a curved path rearwards in the direction of the threaded shank (3) and in the direction of rotation and approach the outside diameter of the polygonal cross-section of the flow-forming section (2) at an angle to the rotation axis (16) and then run out tangentially into the rounded-off corners (13) in the flow-forming section (2).

\* \* \* \* \*